United States Patent [19]
Stotz

[11] Patent Number: 5,662,570
[45] Date of Patent: Sep. 2, 1997

[54] DEFLECTION ADJUSTED ROLL

[75] Inventor: Wolf Gunter Stotz, Ravensburg, Germany

[73] Assignee: Voith Sulzer Papiermaschinen GmbH, Heidenheim, Germany

[21] Appl. No.: 505,849

[22] Filed: Jul. 24, 1995

[30] Foreign Application Priority Data

Jul. 27, 1994 [DE] Germany .......................... 44 26 512.3

[51] Int. Cl.⁶ .................................................. D21F 3/08
[52] U.S. Cl. ............................................ 492/7; 492/20
[58] Field of Search ............................. 492/7, 8, 20, 2, 492/5; 162/358.3, 358.1

[56] References Cited

U.S. PATENT DOCUMENTS

| | | | |
|---|---|---|---|
| 5,206,978 | 5/1993 | Pau | 492/7 |
| 5,386,769 | 2/1995 | Rine | 492/7 |
| 5,447,605 | 9/1995 | Roerig | 492/7 |

FOREIGN PATENT DOCUMENTS 2736656  2/1979  Germany .

OTHER PUBLICATIONS

German Office Action P 44 26 513.1, filed Jul. 27, 1994.
German Office Action P 44 26 512.3, filed Jul. 27, 1994.

*Primary Examiner*—Irene Cuda
*Attorney, Agent, or Firm*—Greenblum & Bernstein, P.L.C.

[57] ABSTRACT

A deflection adjusted roll includes a plurality of hydraulic support elements for a roll jacket, wherein the support elements are provided with a hydraulic pressure medium via a bore axially extending in common with the carrier as well as via further radial bores discharging into the axially extending bore, with the radial bores being in communication with the support elements and separate pressure control of the pressure medium for each support element being achieved in that each one of the radially extending bores is associated with a controllable throttling element, with the throttling element being slidably disposed within the axially extending bore and so shaped and pressed against the inside surface of the axial bore that at least one connecting gap is provided or available between the axial bore and the radial bores, whereby the through-flow quantity of the hydraulic pressure medium is controllable via the cross section of the connecting gap.

29 Claims, 3 Drawing Sheets

DEFLECTION ADJUSTED ROLL

CROSS REFERENCE TO RELATED APPLICATIONS

This application claims the priority of German Patent Application No. P 44 26 512.3, filed Jul. 27, 1994, the disclosure of which is incorporated herein by reference in its entirety.

BACKGROUND OF THE INVENTION

1. Field of the Invention

This invention pertains to a deflection adjusted roll with a fixed carrier and a roll jacket, with the roll jacket being rotatable about the carrier, wherein the roll jacket is supported on hydraulic support elements, with the support elements being provided with a hydraulic pressure medium via a bore axially extending in common with the carrier as well as via further bores, discharging into the axially extending bore, with the further bores also being in communication with each one or groups of the support elements and being substantially radially extending. Such deflection adjusted rolls are, for example, utilized in compacting rolls or smoothing rolls for fiber webs or bands in the paper-making industry.

2. Discussion of the Background of the Invention and Material Information

Rolls of that type are already known, wherein the pressure of the hydraulic pressure medium is supplied to support elements via individually controlled devices, with such devices generally being located outside of the roll. Only the cross section of the roll, that is of the roll carrier, limits the number of inlets and thus thereby also the number of the independently controllable pressure zones of the roll.

For this reason, German Patent Publication DE-PS 27 36 656 suggests a solution, wherein pressure regulators, connected with the inlets and associated with the support elements, are insertable into a bore of the carrier of the roll. In this manner, the pressure regulators are hydraulically pressed in the direction of the connecting bore of each support element, so that a sealed connection is provided between the inlet and the connecting bore via the pressure regulator. However, these devices are too expensive to fabricate.

Thus, it is the task or object of this invention to produce a deflection adjusted roll whose arrangement, for the individual pressure control of the pressure medium supplied to the support elements, is simply constructed and can be located within the deflection adjusted roll.

SUMMARY OF THE INVENTION

This task or object is solved or achieved, in accordance with a first embodiment of this invention, via a deflection adjusted roll comprising a fixed carrier and a roll jacket, with the roll jacket being rotatable about the carrier, wherein the roll jacket is supported on a plurality of hydraulic support elements, with the support elements being provided with a hydraulic pressure medium via a bore axially extending in common with the carrier as well as via further bores, discharging into the axially extending bore, with the further bores also being in communication with at least each one of the support elements and being substantially radially extending, wherein each one of the radially extending bores is associated with a controllable throttling element, with the throttling element being slidably disposed within the axially extending bore of the carrier, for influencing the flow-through of the pressure medium, with the throttling elements being so shaped being are pressed, via at least one biasing element each, against an inside surface of the axially extending bore, so that at least one connecting gap, for the pressure medium, between each of the radially extending bores and the axially extending bore, is one of being provided and created via a plurality of first elements arranged in the axially extending bore, and wherein at least the cross section of the connecting gap, between the throttling element and the axial bore is controllable via one of the plurality of first elements and a plurality of additional elements also located in the axially extending bore.

In a further embodiment of the deflection adjusted roll of this invention, the throttling elements, at least with reference to a directional component in the direction of a discharge end of the radially extending bores, is pressed, via the biasing elements against the inside surface of the axially extending bore.

In another embodiment of the deflection adjusted roll of this invention, the biasing element takes the form of a biased spring element.

In a differing embodiment of the deflection adjusted roll of this invention, the throttling elements are axially interconnected. Preferably, the throttling elements are indirectly connected via a carrier element slidably extending in the axially extending bore of the carrier.

In yet a further embodiment of the deflection adjusted roll of this invention, at least one of the pluralities of first and additional elements of each throttling element, that influence the cross section of the connecting gap, are connected via at least one control conduit with a control unit located outside of the deflection adjusted roll.

In yet another embodiment of the deflection adjusted roll of this invention, at least one of the pluralities of the first and the additional elements of each throttling element, that influence the cross section of the connecting gap, takes the form of one of an electric and a hydraulic positioning element and the control conduits take the form of one of electrical and hydraulic conduits.

In yet a differing embodiment of the deflection adjusted roll of this invention, a side of the throttling element, which side is pressed against the inside of the axially extending bore of the carrier, has a specific profile.

In still a further embodiment of the deflection adjusted roll of this invention, each radial bore includes a discharge region, with each discharge region being formed as a raised area relative to the inside surface of the axially extending bore.

Via the previously described manner, since each of the bores, extending radially relative to the support element, is respectively associated with a controllable throttling element, for controlling the through flow of the pressure medium, slidably arranged in the axially extending and fluid pressure medium-filled bore of the carrier, this eliminates the sealing problems between the pressure regulator and the inside of the axial bore which, for example, is present in already previously described German Patent Publication DE-PS 27 36 656, so that, for that reason, a throttling element, having a relatively weak biasing element, is provided. In addition, minor leaky locations do not lead to a loss of pressure at the respective support element but rather to a steady low pressure in the pressure chamber of the support element which, within limits, is harmless and possibly is even desirable. In the latter case, minimum leakage can be constructively determined via the cross section of the respective connecting gap.

Since the throttling elements are so constructed and are pressed against the inside surface of the axial bore via at least one biasing element, so that at least one connecting gap for the pressure medium is provided between each of the radial or axial bores, or is achievable via elements arranged in the axial bore, and since at least the cross section of one connecting gap is controllable for control of the through flow quantity of the pressure medium of each throttling element or is controllable via this or other elements that are located in the axial bore, a relatively simple and complete assembly of the device is achieved.

It is important in this matter that the carrier, with its axially extending bore, is an integral part of the individually settable throttling device, wherein the spacing of the throttling element, from the axial bore, can be changed for the variation of the cross section of the connecting gap between the axial and the radial bore. In addition, the inner pressure in the axial bore, emanating from the pressure medium, itself provides for the pressing of the throttling element, so that a relatively weak biasing element is sufficient. In all of these observations it is of course a prerequisite that the discharge of the radial bore is covered by the throttling element.

A spring element or member, causing a slight prestress or bias, serves as a biasing element since, in addition to the already previously noted slight pressing force, no special devices are required for permitting a quick pressure release with reference to the pressure chambers of the support elements. In the case of a quick relief or unloading of the support elements, if the applied pressure emanating from the biasing element as well as the pressure medium in the axial bore and acting upon the throttling element against the inside surface of the axial bore, is less than the opposing pressure of the pressure medium in the radial bore, this leads to the lifting of the throttling element from the inside surface of the axial bore and thus to the discharge or drainage of the pressure medium from the radial bore and into the axial bore until there is an equilibrium or balancing of the pressures.

In order to limit the cross section of the connection between the radial and axial bore to the desired dimension, the throttling element should be pressed, at least with reference to a directional component, in the direction of the discharge of the radially extending bore, via the biasing elements, against the inside of the axially extending bore.

In order to enhance the removal of the throttling elements, it is advantageous if the throttling elements are axially interconnected. This can be accomplished via an insertable carrier element fitted into the axially extending bore of the carrier.

The through flow quantity of the pressure medium, with reference to each individual connecting gap, is preferably affected via elements, each of which is connected with at least one control conduit via a control unit located outside of the deflection adjusted roll. These elements are particularly developed as electric or hydraulic actuators or positioning elements together with their associated electric or hydraulic lines or conduits. It can also be an advantage if, during an interruption of the supply of energy, the position of the actuators can be maintained.

BRIEF DESCRIPTION OF THE DRAWINGS

In the invention, which will be described with reference to five embodiments thereof, the directional references to axial and radial should always be interpreted with reference to the deflection adjusted roll. The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

Figure 1:
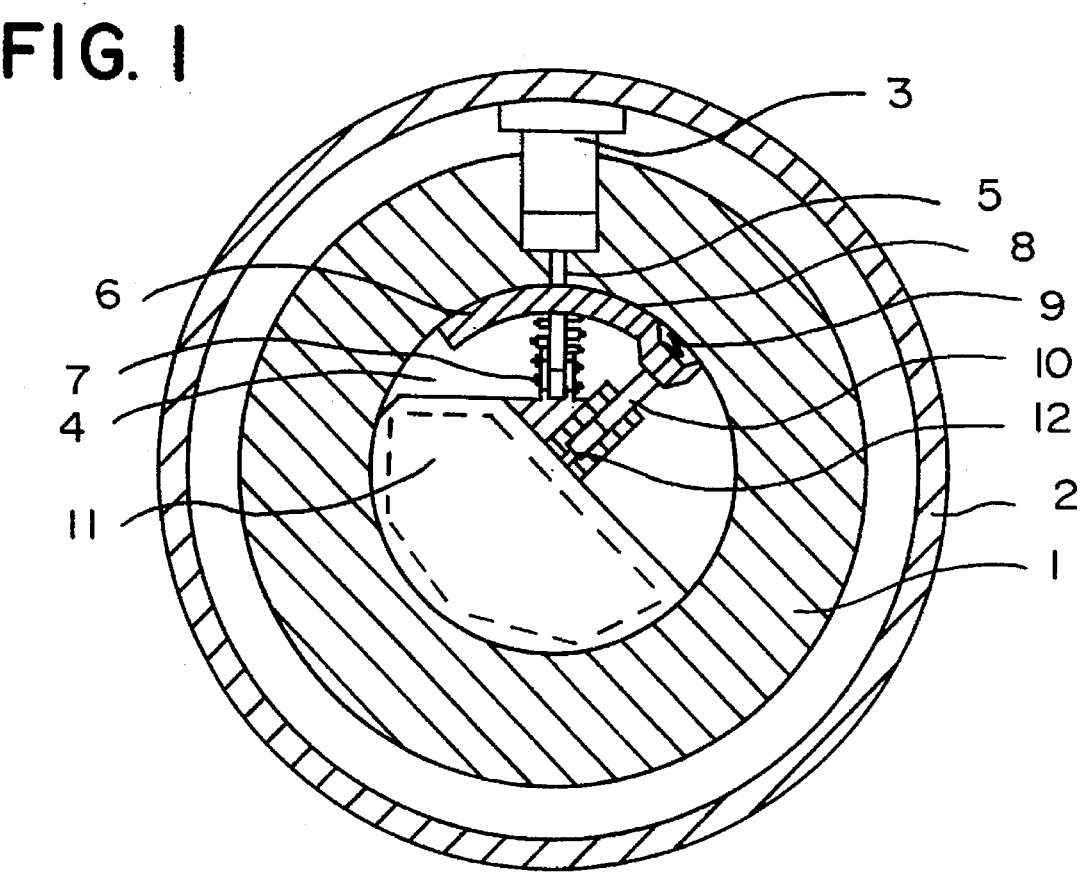
FIG. 1 is a schematic cross section of a deflection adjusted roll with a first embodiment of the throttle element of this invention.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

In each of the examples of the embodiments, the deflection adjusted or adjustment roll is provided with a fixed carrier 1 and a roll jacket or covering 2, rotatable around carrier 1, with roll jacket 2 being supported on hydraulic support elements 3 that are supplied with hydraulic pressure medium via a bore 4 axially extending in common with carrier 1 as well as via further bores 5, discharging into bore 4, with the further bores 5 being in connection with each of support elements 3. In order to achieve a hydraulic pressure increase, a throttled discharge of the pressure medium must be provided from the hydraulic pressure chamber of support element 3. This can be achieved via at least, for example, a throttled conduit extending directly in the interior of the roll jacket or extending to hydrostatic bearing pockets of the support element 3.

In addition, each one of the radially extending bores 5 is associated with a controllable throttling element 6, with throttling element 6 being slidably disposed within the axially extending bore 4 of carrier 1. Throttling elements 6 extend over a portion of the inside surface of axial bore 4 and are, with reference to the touching side, adapted as best possible to the form or shape of the inside surface of axial bore 4. Via at least one biasing element 7, in the form of a spiral spring, throttling elements 6 are pressed, in the direction of the discharge of radial bores 5, against the inside surface of axial bore 4.

The spiral springs, which affect a preload or bias, are supported or biased against a carrier element 11, with the latter being insertable into and extending in axially extending bore 4 of carrier 1. This carrier element 11 is located approximately across from radial bores 5 in the inside of axially extending bore 4 and serves, at the same time, for interconnecting throttling elements 6. This connection is, however so accomplished that radial movement is assured between each throttling element 6 and carrier 11, which can be readily accomplished via any known guiding devices. Therewith, this enables not only the already-noted quick pressure equalization, from the radial bores 5 in the direction of the axial bore 4, but also the insertability of the throttling elements 6 into axial bore 4. The amount of through flow of the pressure medium is influenced per unit time via elements 9 or 10 of each of the throttling elements, wherein these elements 9 or 10, in the illustrated cases, are connected via at least one hydraulic or electric control conduit 12 with a control unit located outside of the deflection adjusted roll, with these elements taking the form of hydraulic or electric actuators.

In the embodiment shown in FIG. 1, throttling element 6 is lifted from the inside surface of axial bore 4 via an element 9, in the form of a spring that is arranged between throttling element 6 and the inside surface of axial bore 4 on at least one side against the force of biasing element 7, for the production or establishment of a connecting gap 8 for the pressure medium between radial bores 5 and axial bore 4. From the approximately radially opposed side of throttling element 6, situated across from this element 9, another element 10, for influencing the cross section of connecting gap 8 of throttling device 6, affects throttling device 6. This element 10 takes the form of a hydraulic actuator or positioning element and is connected with a control unit via a control conduit 12, wherein this actuator, via the hydraulic pressure in control conduit 12, acts adjustably against the force of element 9, and thereby controllably changes the cross section of connecting gap 8.

Figure 2:
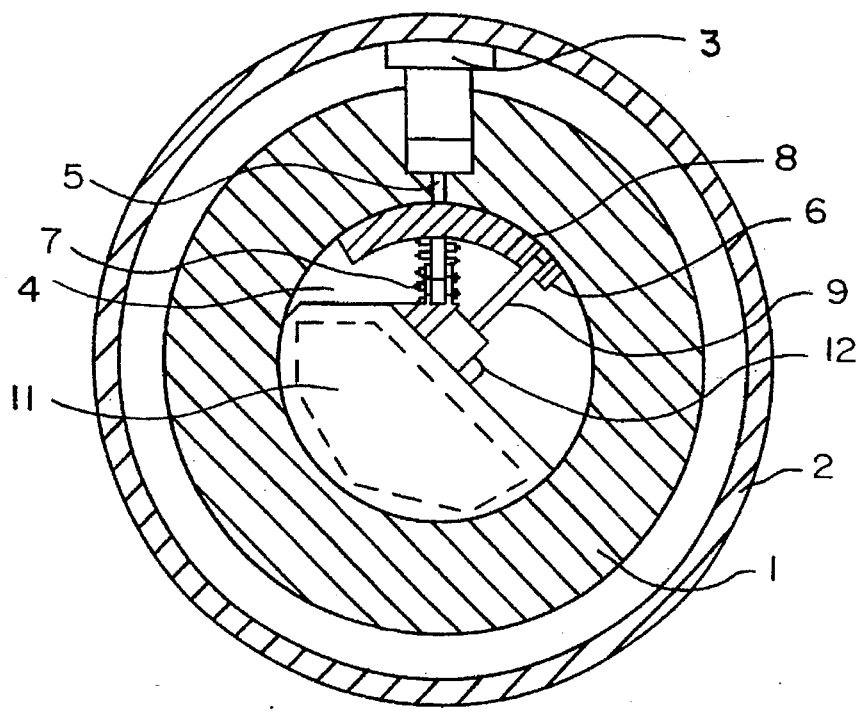
FIG. 2 is a schematic cross section of a deflection adjusted roll with a second embodiment of the throttle element of this invention.
Figure 3:
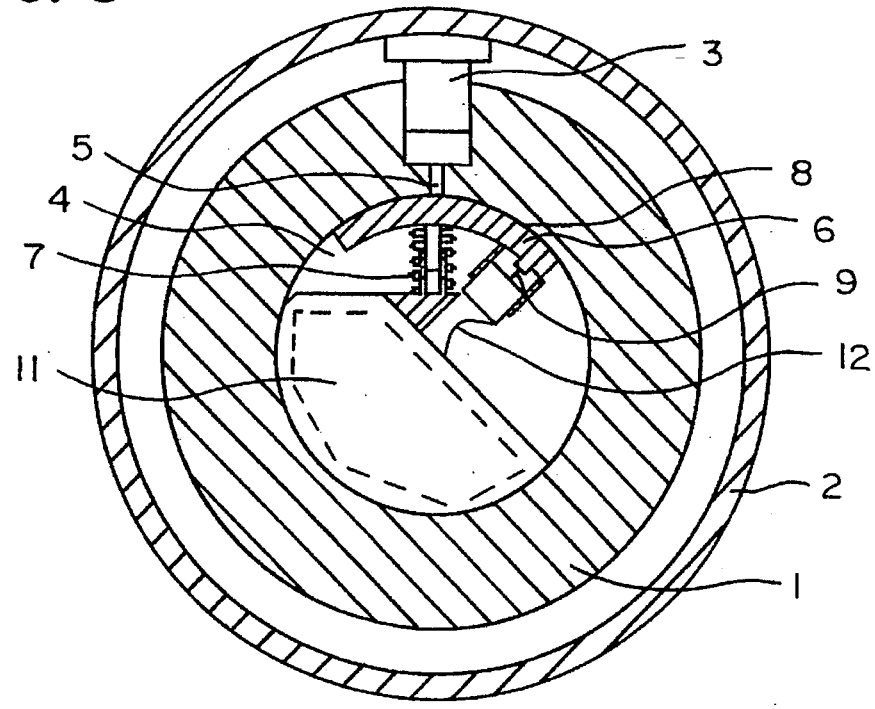
FIG. 3 is a schematic cross section of a deflection adjusted roll with a third embodiment of the throttle element of this invention.

FIGS. 2 and 3 illustrate different embodiments of this invention wherein throttling element 6 is controllably lifted from the inside surface of axial bore 4, via an element 9 in the form of a threaded bolt or member, radially guided in a threaded bore of throttling element 6, at least on one side, against the force of biasing element 7, for the establishment and influencing of the cross section of connecting gap 8 for the pressure medium between radial bores 5 and axial bore 4.

The establishment or the changing of the distance between throttling element 6 and the inside surface of axial bore 4 occurs, as per FIG. 3, via the turning of the threaded bolt, wherein the distance between throttling element 6 and the end of the threaded bolt, supported on the inside-surface of axial bore 4, is changed depending on the turning direction. The turning is accomplished via a motor coupled with the threaded bolt. This motor is fixed at throttling element 6 and preferably takes the form of an electric motor operator connected to the control unit via an electric conduit. The coupling between the threaded bolt and the motor occasions a radial displacement of the threaded bolt relative to the motor.

The cross section of the connecting gap 8 is, for example, as per FIG. 2, also changed via a threaded bolt. This threaded bolt is situated in a bore, radial with reference to throttling element 6, and the other side thereof is fixedly connected with a motor, which in turn is affixed to carrier element 11. Depending upon the direction of movement of the motor, the throttling element 6 is either pulled to carrier element 11 or moved to the inside surface of axial bore 4. The motor there also takes the form of a motor operator or servo motor that is connected with the control unit via at least one electric conduit. This threaded bore should be offset with reference to radial bore 5 so that throttling element 6, at a sufficiently high pressure in radial bore 5, can pull up at least unilaterally from the inside surface of axial bore 4 and that therewith, via the reversal of the direction of flow, a pressure equalization can be accomplished.

Corresponding to the example of FIG. 3, it would also be quite feasible, in a further non-illustrated variation, that the threaded bolt is supported on the inside surface of axial bore 4 for changing connecting gap 8, wherein here also the coupling between the threaded bolt and the motor permits a displacement of the threaded bolt relative to the motor. In distinction with FIG. 3, the motor however would be affixed at carrier element 11.

In the noted embodiments of the invention described heretofore, a connecting gap can already exist between axial bore 4 and radial bore 5, which, for example, is achieved via a clearance or recess at throttling element 6 at the side of throttling element 6 that faces the inside surface of axial bore 4. This connecting gap 8 thereby provides therewith for a minimal pressure at support element 3 and can be changed via elements 9 that influence the cross section thereof. It is of course also possible to altogether initially form and then change a connecting gap 8, via these elements 9.

Figure 4:
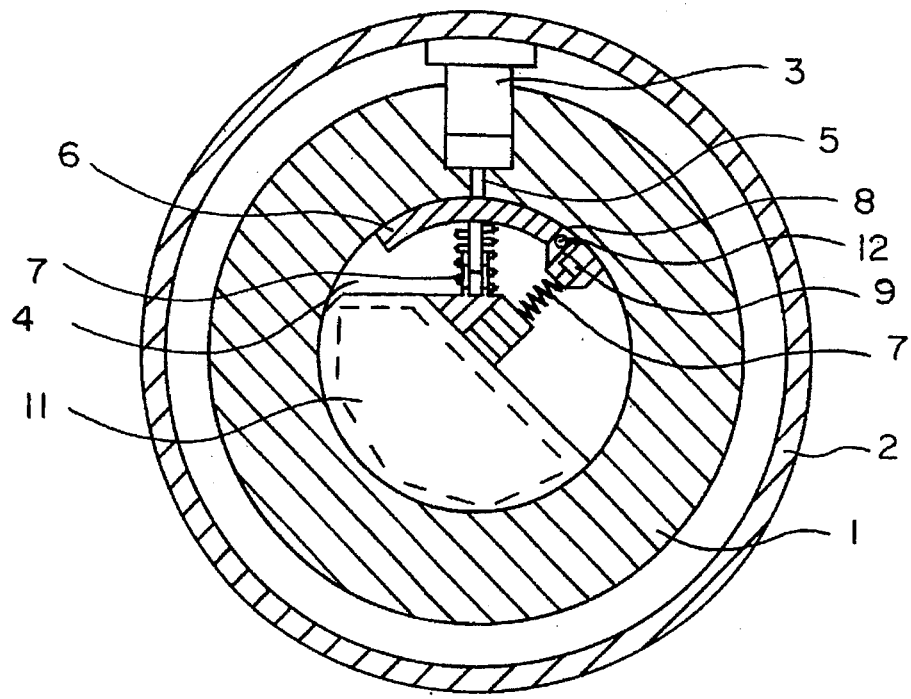
FIG. 4 is a schematic cross section of a deflection adjusted roll with a fourth embodiment of the throttle element of this invention.

FIG. 4 illustrates a further form of a solution wherein the throttling element 6 is pressed against the inside surface of axial bore 4, in the direction of the discharge of radial bore 5, via biasing elements 7, in the form of two spiral springs. The spiral springs are herein supported at carrier element 11.

The establishment and changing of the distance between throttling element 6 and the inside surface of axial bore 4 is realized in the manner that element 9, which influences the cross section of connecting gap 8, is formed as a cylinder-piston device that is affixed at throttling element 6. Via the piston, supported in the pressure chamber of the cylinder-piston device and on the inside surface of axial bore 4, the distance between throttling element 6 and the inside surface of axial bore 4, and thereby also the cross section of connecting gap 8, relative to connecting gap 8 to radial bore 5, can be determined. The pressure chamber of the cylinder-piston device is connected with a hydraulic control conduit 12.

Figure 5:
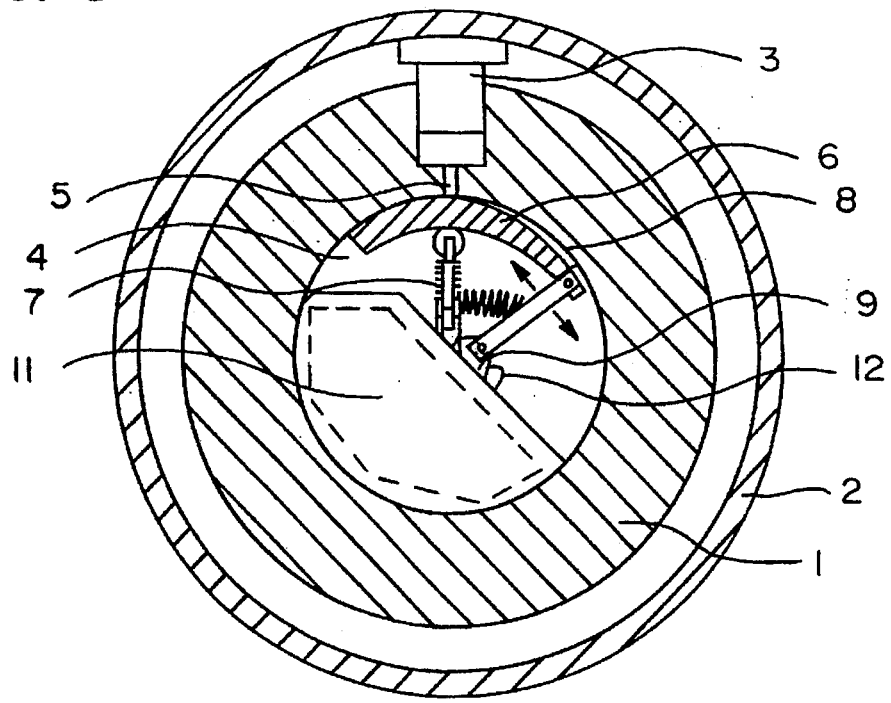
FIG. 5 is a schematic cross section of a deflection adjusted roll with a fifth embodiment of the throttle element of this invention.

The embodiment illustrated in FIG. 5 deviates somewhat from the previously described embodiments in that here the throttling element 6 is also moveable in the circumferential direction of axial bore 4, which movement can readily be accomplished via a suitable roll journalling thereof on biasing element 7. Throttling element 6 forms, with the inside surface of axial bore 4, a connecting gap 8 whose cross section, from an entry side of the circumferential direction, continuously decreases, so that the actual minimal cross section of connecting gap 8, with reference to radial bore 5, is changeable in the circumferential direction via a movement of throttling element 6 occasioned via an element 9. A servo motor, attached at carrier 1, serves as element 9, with the servo motor being so connected with throttling element 6, via a pivot lever, so that a pivoting or lifting of throttling element 6, from the inside surface of axial bore 4, for pressure equalization, starting at radial bore 5, becomes possible. The home position of element 9, that is a substantially closed connecting gap 8 can, at the failure of element 9, be assured via a spring element acting upon the pivot lever. It is however also quite possible, in case no spring element is available, that the lastly set position is retained.

Control conduits 12 can, as indicated in the figures, extend within carrier element 11 or also freely extend in the intermediate space.

Figure 6:
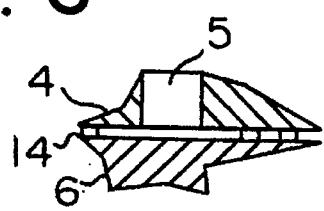
FIG. 6 is a schematic partial section of one embodiment of the discharge area of a radial bore into an axial bore.
Figure 7:
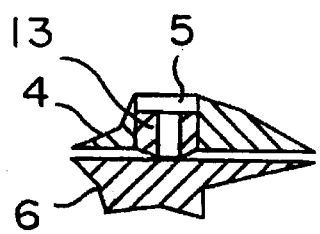
FIG. 7 is a schematic partial section of another embodiment of the discharge area of a radial bore into an axial bore.

In order to facilitate the pressure equalization between radial bore 5 and axial bore 4, at a very exact fitting between throttling element 6 and axial bore 4, starting at radial bore 5, it is of advantage if particularly the side of throttling element 6, that is pressed against the inside, has the profile as shown in FIG. 6. For the same reason, the discharge regions of radial bores 5 can respectively be shaped or formed as raised areas relative to the inside surface of axial bore 4. FIG. 7 illustrates an exemplary embodiment in which, in order to keep the manufacture of carrier 1 simple, radial bore 5 is provided with a discharge element 13 which, at least minimally, extends over the inside surface of axial bore 4 and which thereby distances throttling element 6 from the inside surface of axial bore 4. Discharge element 13 can, for example, be threaded or bonded into radial bore 5.

The raised areas in FIGS. 6 and 7 are greatly exaggerated and correspond in actual usage often only several thousands of a mm.

It is of importance, in all examples, that the inside surface of axial bore 4 is utilized for the formation of connecting gap 8, so that carrier 1 is itself a portion of the throttling element.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A deflection adjusted roll comprising a fixed carrier and a roll jacket, with the roll jacket being rotatable about the carrier, wherein the roll jacket is supported on a plurality of hydraulic support elements, with the support elements being provided with a hydraulic pressure medium via a bore axially extending in common with the carrier as well as via further bores, discharging into the axially extending bore, with the further bores also being in communication with at least each one of the support elements and being substantially radially extending, wherein each one of the radially extending bores is associated with a controllable throttling element, with the throttling element being slidably disposed within the axially extending bore of the carrier, for influencing the flow-through of the pressure medium, with the throttling elements being so shaped being are pressed, via at least one biasing element each, against an inside surface of the axially extending bore, so that at least one connecting gap, for the pressure medium, between each of the radially extending bores and the axially extending bore, is one of being provided and created via a plurality of first elements arranged in the axially extending bore, and wherein at least the cross section of the connecting gap, between the throttling element and the axial bore is controllable via one of the plurality of first elements and a plurality of additional elements also located in the axially extending bore.

2. The deflection adjusted roll of claim 1, wherein the throttling elements, at least with reference to a directional component in the direction of a discharge end of the radially extending bores, is pressed, via the biasing elements against the inside surface of the axially extending bore.

3. The deflection adjusted roll of claim 1, wherein the biasing element takes the form of a biased spring element.

4. The deflection adjusted roll of claim 2, wherein the biasing element takes the form of a biased spring element.

5. The deflection adjusted roll of claim 1, wherein the throttling elements are axially interconnected.

6. The deflection adjusted roll of claim 2, wherein the throttling elements are axially interconnected.

7. The deflection adjusted roll of claim 3, wherein the throttling elements are axially interconnected.

8. The deflection adjusted roll of claim 5, wherein the throttling elements are indirectly connected via a carrier element slidably extending in the axially extending bore of the carrier.

9. The deflection adjusted roll of claim 1, wherein at least one of the pluralities of first and additional elements of each throttling element, that influence the cross section of the connecting gap, are connected via at least one control conduit with a control unit located outside of the deflection adjusted roll.

10. The deflection adjusted roll of claim 2, wherein at least one of the pluralities of first and additional elements of each throttling element, that influence the cross section of the connecting gap, are connected via at least one control conduit with a control unit located outside of the deflection adjusted roll.

11. The deflection adjusted roll of claim 3, wherein at least one of the pluralities of first and additional elements of each throttling element, that influence the cross section of the connecting gap, are connected via at least one control conduit with a control unit located-outside of the deflection adjusted roll.

12. The deflection adjusted roll of claim 5, wherein at least one of the pluralities of first and additional elements of each throttling element, that influence the cross section of the connecting gap, are connected via at least one control conduit with a control unit located outside of the deflection adjusted roll.

13. The deflection adjusted roll of claim 8, wherein at least one of the pluralities of first and additional elements of each throttling element, that influence the cross section of the connecting gap, are connected via at least one control conduit with a control unit located outside of the deflection adjusted roll.

14. The deflection adjusted roll of claim 9, wherein at least one of the pluralities of the first and the additional elements of each throttling element, that influence the cross section of the connecting gap, takes the form of one of an electric and a hydraulic positioning element and the control conduits take the form of one of electrical and hydraulic conduits.

15. The deflection adjusted roll of claim 1, wherein a side of the throttling element, which side is pressed against the inside of the axially extending bore of the carrier, has a specific profile.

16. The deflection adjusted roll of claim 2, wherein a side of the throttling element, which side is pressed against the inside of the axially extending bore of the carrier, has a specific profile.

17. The deflection adjusted roll of claim 3, wherein a side of the throttling element, which side is pressed against the inside of the axially extending bore of the carrier, has a specific profile.

18. The deflection adjusted roll of claim 5, wherein a side of the throttling element, which side is pressed against the inside of the axially extending bore of the carrier, has a specific profile.

19. The deflection adjusted roll of claim 8, wherein a side of the throttling element, which side is pressed against the inside of the axially extending bore of the carrier, has a specific profile.

20. The deflection adjusted roll of claim 9, wherein a side of the throttling element, which side is pressed against the inside of the axially extending bore of the carrier, has a specific profile.

21. The deflection adjusted roll of claim 14, wherein a side of the throttling element, which side is pressed against the inside of the axially extending bore of the carrier, has a specific profile.

22. The deflection adjusted roll of claim 1, wherein each radial bore includes a discharge region, with each discharge region being formed as a raised area relative to the inside surface of the axially extending bore.

23. The deflection adjusted roll of claim 2, wherein each radial bore includes a discharge region, with each discharge region being formed as a raised area relative to the inside surface of the axially extending bore.

24. The deflection adjusted roll of claim 3, wherein each radial bore includes a discharge region, with each discharge region being formed as a raised area relative to the inside surface of the axially extending bore.

25. The deflection adjusted roll of claim 5, wherein each radial bore includes a discharge region, with each discharge region being formed as a raised area relative to the inside surface of the axially extending bore.

26. The deflection adjusted roll of claim 8, wherein each radial bore includes a discharge region, with each discharge region being formed as a raised area relative to the inside surface of the axially extending bore.

27. The deflection adjusted roll of claim 9, wherein each radial bore includes a discharge region, with each discharge region being formed as a raised area relative to the inside surface of the axially extending bore.

28. The deflection adjusted roll of claim 14, wherein each radial bore includes a discharge region, with each discharge region being formed as a raised area relative to the inside surface of the axially extending bore.

29. The deflection adjusted roll of claim 15, wherein each radial bore includes a discharge region, with each discharge region being formed as a raised area relative to the inside surface of the axially extending bore.

* * * * *